United States Patent Office 3,778,430
Patented Dec. 11, 1973

3,778,430
SILICON SUBSTITUTED AZONITRILES
Joel D. Citron, Wilmington, Del., assignor to E. I. du Pont de Nemours and Company, Wilmington, Del.
No Drawing. Filed May 25, 1971, Ser. No. 146,801
Int. Cl. C07c *107/00*
U.S. Cl. 260—192                                      8 Claims

ABSTRACT OF THE DISCLOSURE

Compound of the formula

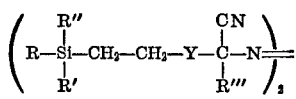

where R is alkyl, fluoro-substituted alkyl wherein the fluoro substituent is no closer than the gamma position with respect to Si, phenyl, lower alkyl substituted phenyl, fluoro-substituted phenyl, benzyl or lower alkyl substituted benzyl; R' is a lower alkoxy, aryloxy, alkaryloxy or lower aralkoxy; Y is a saturated lower alkylene; R" is independent of R and R' and is any of the above named groups representing R or R'; and R''' is a lower alkyl, lower alkyl substituted phenyl, benzyl, or lower alkyl substituted benzyl wherein substitution is at other than an alpha position. The compounds find use as free radical initiators in polymerization reactions, and are particularly useful for preparing moisture curable fluorocarbon caulking compounds.

BACKGROUND OF THE INVENTION

This invention relates to silicon substituted azonitrile compounds and a process for their preparation.

Certain rubbery or elastic materials, such as silicone rubber, have been found useful as caulking compounds. Caulking compounds are used to seal the seams between adjoining structures to prevent leakage. For example, the seam formed by a window frame installed in a wall is frequently sealed with a caulking compound to prevent the passage of air and moisture. These compounds also find use, for example, as linings for aircraft fuel tanks, solvent storage tanks and the like.

The thermal stability, oil resistance, and solvent resistance of the silicone rubber based caulking compounds have not proved entirely satisfactory. Thus there has been a need for caulking compounds having improved oil and solvent resistance and improved thermal stability. Such caulking compounds should also be pourable at room temperature and curable upon contact with moisture in air at room temperature.

One means of partially fulfilling this need would be to use a caulk containing a fluorocarbon polymer having superior oil and solvent resistance and thermal stability. However, known fluorocarbon polymers cannot be satisfactorily cured by exposure to moisture in air at room temperature.

SUMMARY OF THE INVENTION

This invention provides a compound of the formula

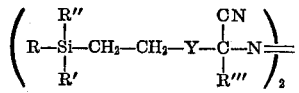

where R is alkyl, fluoro-substituted alkyl wherein the fluoro substituent is no closer than the gamma position with respect to Si, phenyl, lower alkyl substituted phenyl, fluoro-substituted phenyl, benzyl or lower alkyl substituted benzyl; R' is a lower alkoxy, aryloxy, alkaryloxy or lower aralkoxy; Y is a saturated lower alkylene; R" is independent of R and R' and is any of the above named groups representing R or R'; and R''' is a lower alkyl, lower alkyl substituted phenyl, benzyl, or lower alkyl substituted benzyl wherein substitution is at other than an alpha position.

There is also provided a process for the preparation of silicon substituted azonitriles consisting essentially of reacting an unsaturated ketone with a stoichiometric amount of hydrazine, isolating the resulting unsaturated azine, hydrosilating said unsaturated azine in the presence of a catalytic amount of chloroplatinic acid under substantially anhydrous conditions to form a silicon substituted azine, reacting said silicon substituted azine with at least a stoichiometric amount of hydrogen cyanide at about 25° C. to about 100° C. under substantially anhydrous conditions to form a hydrazonitrile, reacting said hydrazonitrile with about a stoichiometric amount of chlorine and then a tertiary amine base under substantially anhydrous conditions at about —15° C. to about 10° C., and isolating the resulting silicon substituted azonitrile.

Further, there is provided a compound of the formula

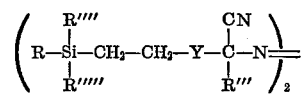

where R, R''' are indicated above, and R'''' and R''''' can be any of the groups of R' and R", respectively, or chlorine.

The compounds of this invention, hereinafter referred to as the novel silicon substituted azonitriles, are useful as free radical initiators in the polymerization reactions. These silicon substituted azonitriles are particularly useful for preparing low molecular weight fluorocarbon polymers which are fluid at room temperature, and which can be chain-extended and cross-linked. Fluorocarbon polymers prepared using the novel silicon substituted azonitriles contain end groups derived from the azonitriles which become cure-sites upon exposure to the moisture in air at room temperature. Thus, these fluorocarbon polymers are particularly useful as caulking compounds.

The novel silicon substituted azonitriles are also used for preparing high molecular weight polymers useful as elastomers.

DESCRIPTION OF THE INVENTION

The novel silicon substituted azonitriles are represented by the generic formula

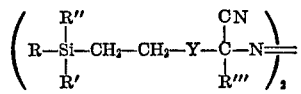

The radical R in the formula can be selected from alkyl, aryl, or aralkyl radicals. "Alkyl" refers to a $C_1$–$C_{18}$ hydrocarbon group. "Lower alkyl," "lower alkoxy," etc., refers to the respective groups containing 8 or less carbon atoms in the alkyl group. However, $C_1$–$C_6$ alkyl groups are preferred, that is, a methyl, ethyl, propyl, butyl, pentyl, or hexyl radical. Particularly preferred is the methyl radical.

When R is a substituted alkyl radical, it can contain a fluorine substituent. However, when R is a fluoro-substituted alkyl, the substituent must be no closer than the gamma position with respect to Si, that is, it cannot be in an alpha or beta position. Thus, the substituted alkyl must have at least three carbon atoms. Fluoro-substituted $C_3$–$C_8$ alkyls are preferred, and 3,3,3-trifluoropropyl is particularly preferred. Typical of some of the other fluoro-substituted alkyl radicals are 3-fluoropropyl, 3,3-difluoropropyl, 4,4,4-trifluorobutyl, 3,3,4,4,4 - pentafluorobutyl, 1,1,2,2-H-tridecafluorooctyl, 3 - (trifluoromethyl)-4,4,4-trifluorobutyl, 3 - (trifluoromethyl)-3,4,4,4-tetrafluorobutyl, 2-(trifluoromethyl)-3,3,3-trifluoropropyl, 1,1,2,2,8-H-dodecafluorooctyl, and 1,1,2,2-H-nonafluorohexyl.

Where R is an aryl radical, phenyl is preferred. R can also be a lower alkyl substituted aryl radical, such as substituted phenyl; $C_1$–$C_6$ alkyl substituted phenyl radicals are preferred. Also useful are fluoro-substituted phenyl radicals. Typical of some of the lower alkyl-substituted aryl radicals are o-tolyl, m-tolyl, p-tolyl, 2,3-dimethylphenyl, 2,4 - dimethylphenyl, 2,5-dimethylphenyl, o-ethylphenyl, m-ethylphenyl, p-ethylphenyl, 2-methyl-3-ethylphenyl, 2-methyl-4-ethylphenyl, 2-methyl-5-ethylphenyl, o-propylphenyl, m-propylphenyl, p-propylphenyl, p-isopropylphenyl, o-butylphenyl, m-butylphenyl, p-butylphenyl, p - isobutylphenyl, and 3 - tert-butyl-5-methylphenyl.

Typical of fluoro-substituted phenyl groups are o-fluorophenyl, m-fluorophenyl, p-fluorophenyl, pentafluorophenyl, 1,2,3,4 - tetrafluorophenyl, 1,2,3,5 - tetrafluorophenyl, 2,4,6-trifluorophenyl, 2,3,4-trifluorophenyl, 2,3,5-trifluorophenyl, 2,3,6-trifluorophenyl, 2,3-difluorophenyl, 2,4-difluorophenyl, 2,5-difluorophenyl, 2,6-difluorophenyl, and 3,4-difluorophenyl.

The radical R can also be an aralkyl group in which case benzyl is preferred.

The radical R'' is independent of R, R' and R''' and can be any of the groups specified for R or R'.

The radical R''' in the generic formula above can be a lower alkyl radical, lower alkyl substituted phenyl, or an aralkyl radical. When R''' is a lower alkyl radical, $C_1$–$C_6$ alkyl radicals are preferred. Methyl is particularly preferred. The lower alkyl radical can also contain substituents, such as a halogen or a hetero atom such as oxygen.

The radical R''' can also be lower alkyl substituted phenyl. Typical of these radicals are o-tolyl, m-tolyl, p-tolyl, 2,3 - dimethylphenyl, 2,4 - dimethylphenyl, 2,5-dimethylphenyl, o-ethylphenyl, m-ethylphenyl, p-ethylphenyl, 2-methyl-3-ethylphenyl, 2 - methyl-4-ethylphenyl, 2-methyl-5-ethylphenyl, o-propylphenyl, m - propylphenyl, p-propylphenyl, p - isopropylphenyl, o-butylphenyl, m-butylphenyl, p-butylphenyl, p-isobutylphenyl, and 3-tert-butyl-5-methylphenyl.

When R''' is an aralkyl radical, benzyl is preferred. The benzyl radical can also contain lower alkyl substituents wherein substitution is at other than an alpha position. $C_1$–$C_6$ alkyl substituents are preferred. A methyl substituent is particularly preferred. Typical of other lower alkyl-substituted benzyl radicals are o-methylbenzyl, m-methylbenzyl, p-methylbenzyl, 2,3 - dimethylbenzyl, 2,4-dimethylbenzyl, 2,5 - dimethylbenzyl, 2,6-dimethylbenzyl, o-ethylbenzyl, m-ethylbenzyl, p-ethylbenzyl, 4-methyl - 3 - ethylbenzyl, m-isopropylbenzyl, p-propylbenzyl, 3-ethyl-5-propylbenzyl, 3-sec-butylbenzyl, o-butylbenzyl, 4-tert-butylbenzyl, and 3-methyl-4-isopropylbenzyl.

The radical R' in the above generic formula can be independently alkoxy, aralkoxy, or alkaryloxy or aryloxy radicals. When R' is an alkoxy radical, a lower alkoxy radical is preferred, for example, a methoxy, ethoxy, propoxy, isopropoxy, butoxy, isobutoxy, etc. radical. Methoxy and ethoxy radicals are particularly preferred.

When R' is an aralkoxy radical, a lower alkyl is preferred. For example, benzyloxy is particularly preferred. The benzyloxy radical can be substituted, for example, with a halogen. Typical of the useful lower aralkyloxy radicals are benzyloxy, 1-phenylethoxy, 2-phenylethoxy, 1,2-diphenylethoxy, 1-phenylpropoxy, 2-phenylpropoxy, 3-phenylpropoxy, 1 - phenyl-2-propoxy, 2-phenyl-2-propoxy, 1-phenylbutoxy, 4-phenylbutoxy, 1-phenyl-2-methylpropoxy, 2-phenyl-2-methylpropoxy, 3-phenyl-2-methylpropoxy, 1-phenyl-2-butoxy, 2-phenyl-2-butoxy, 3-phenyl-2-butoxy, and 4-phenyl-2-butoxy.

When R' is an aryloxy radical, it can be substituted, for example, with halogen.

Typical of the lower alkaryloxy radicals are o-tolyloxy, p-tolyloxy, m-tolyloxy, 2,3-dimethylphenoxy, 2,4-dimethylphenoxy, 2,5-dimethylphenoxy, o-ethylphenoxy, m-ethylphenoxy, p-ethylphenoxy, 2-methyl-3-ethylphenoxy, 2-methyl-4-ethylphenoxy, 2-methyl - 5 - ethylphenoxy, o-propylphenoxy, m-propylphenoxy, p-propylphenoxy, p-isopropylphenoxy, o-butylphenoxy, m-butylphenoxy, p-butylphenoxy, p-isobutylphenoxy, and 3-tert-butyl-5-methylphenoxy. The lower alkaryloxy radicals are preferred, especially lower alkyl substituted aryl radicals. Alkyl radicals having one to six carbon atoms are particularly preferred. It is also preferred that the aryloxy be phenoxy.

The difunctional hydrocarbon radical Y in the above generic formula can be a saturated lower alkylene radical. $C_1$–$C_6$ alkylene radicals are preferred, and methylene and ethylene radicals are particularly preferred.

Any of the aforementioned alkyl radicals and substituted alkyl radicals can be cycloaliphatic radicals, for example, cyclohexane. Furthermore,

can be replaced with a saturated carbocyclic ring. For example,

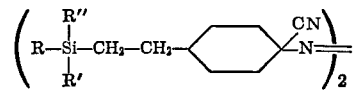

The novel silicon substituted azonitriles can be prepared by a series of chemical reactions, the sequence of which is critical.

The first step consists essentially of reacting an unsaturated ketone with hydrazine to form an unsaturated azine. For example, allyl acetone can be reacted with hydrazine hydrate according to the following equation

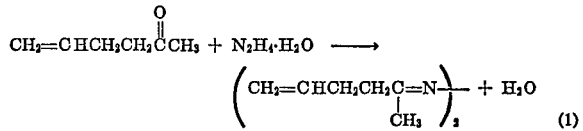

(1)

The ketone employed in Equation 1 should be selected to provide the desired R''' and Y radicals in the novel silicon substituted azonitrile. For example, the ketone in Equation 1 can be used to prepare a novel silicon substituted azonitrile in which R''' is $CH_3$— and Y is —$(CH_2)_2$—. Thus, proper selection of the unsaturated ketone as one of the starting materials is important in obtaining the desired novel silicon substituted azonitrile.

Some unsaturated ketones are commercially available and others can be prepared by methods well known to those skilled in the art. For example, French Pat. 1,384,-137 issued Nov. 23, 1964 teaches general procedures which have been found useful in preparing ketones employed in this invention.

The art skilled will recognize that the temperature at which the first reaction is conducted will depend upon the ketone employed. The more sterically hindered the carbonyl group, the higher the temperature of reaction. For the reaction represented by Equation 1, the reaction is generally conducted between about 0° C. and about 120° C., preferably about 25° C. to about 105° C. Since the reaction is often exothermic conventional cooling techniques can be used. If prolonged heating is required, the atmosphere above the reactants is preferably kept free of oxygen since hydrazine may be sensitive to oxidation.

The reaction is generally conducted at atmospheric pressure although higher or lower pressures can be used.

The reaction can optionally be conducted in an inert solvent. By inert is meant that the solvent does not react with the reactants or product formed. Use of a solvent is preferred when the reactants are immiscible. Further, the reactants can optionally be subjected to mild agitation.

Preferably a stoichiometric amount of the reactants is employed. A slight molar excess of the ketone can be used, however, unreacted ketone should be removed upon completion of the reaction. An excess of hydrazine should be avoided in order to prevent the formation of a hemiazine.

The unsaturated azine should be isolated from the reaction mass by conventional techniques. For example, a solid azine can be isolated by crystallization, or a liquid azine by distillation, such as at reduced pressure.

It has surprisingly been found that the unsaturated azine prepared in accordance with Equation 1 can be reacted with a silicon hydride in the presence of chloroplatinic acid to obtain a silicon substituted azine. Prior to this invention, it was not known that alkenyl azines could be reacted in this manner. Furthermore, it has been found that the conditions for conducting hydrosilation reactions are applicable to reactions for preparing the silicon-substituted azines.

The unsaturated azine prepared according to Equation 1 can be reacted under substantially anhydrous conditions with a silicon hydride in the presence of chloroplatinic acid according to the following equation

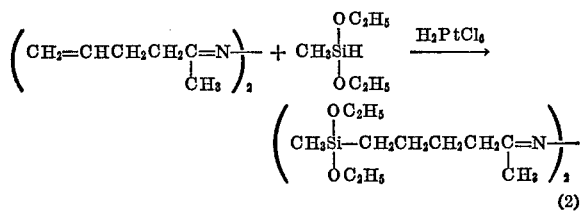

(2)

The product obtained is a silicon substituted azine.

The silicon hydride employed as a reactant in Equation 2 should be selected to provide the desired R, R' and R" radicals in the novel silicon substituted azonitrile. For example, the silicon hydride in Equation 2 can be used to prepare a novel silicon substituted azonitrile in which R is a methyl radical and R' and R" are ethoxy radicals.

Desired silicon hydrides which are not commercially available can be prepared by methods well known to those skilled in the art. See C. Eaborn, Organosilicon Compounds, Butterworth Scientific Publications, London (1960), and V. Bazant, V. Chvalovsky, and J. Rathousky, Organosilicon Compounds, Academic Press, New York (1965).

The reaction represented by Equation 2 and all the reactions which follow are conducted under substantially anhydrous conditions. This means that water and water vapor should be practically absent in order to avoid hydrolysis of silicon containing compounds.

A particularly preferred embodiment of this invention involves the use of a chlorine-containing silicon hydride in the hydrosilation reaction. By "chlorine-containing silicon hydride" is meant a silicon hydride containing chlorine in place of the alkoxy groups. This is especially preferred where the alkoxy group in the final product is sterically hindered, such as with a t-butoxy group.

When an alkoxy containing silicon hydride is used, the reaction temperature is generally about 75° C. to about 180° C., preferably about 90° C. to about 150° C. When a chloro-containing silicon hydride is used, the reaction should be conducted at as low a temperature as possible because of the thermal instability of the chlorosilylated azine formed. This temperature is generally about 0° C. to about 120° C., preferably about 0° C. to about 100° C.

The reaction is generally conducted at atmospheric pressure or autogenous pressure although the pressure is not critical.

Use of chloroplatinic acid in hydrosilation reactions generally is well known in the art. See, for example, U.S. Pat. 2,823,218. A catalytic amount is used herein. The catalyst is preferably used in an amount of about 0.001 to about 0.05 mole percent based on the unsaturated azine.

A solvent is not required, but can be used. Mild agitation can also be used.

The reaction is generally conducted in an inert atmosphere substantially free of water vapor. A nitrogen atmosphere is preferred.

A stoichiometric amount of the silicon hydride with respect to the unsaturated azine can be used. A slight molar excess, e.g. about 10 percent, of the silicon hydride can also be used to assure hydrosilation of both end groups of the unsaturated azine.

It is preferable to isolate the silicon substituted azine from the reaction mass before proceeding with the preparation of the novel silicon substituted azonitrile. Isolation can be accomplished by conventional techniques. Chlorine containing silicon substituted azines may not be distillable, but can be converted to alkoxy containing silicon substituted azines and then distilled (see Example 8).

The conditions for conducting hydrosilation reactions are known to those skilled in the art. See, for example, E. Lukevits and M. Voronkov, Organic Insertion Reactions of Group IV Elements, Consultants Bureau, New York (1966), pages 242–293.

The third step in the process consists essentially of reacting the silicon substituted azine with at least a stoichiometric amount of anhydrous hydrogen cyanide to form a hydrazonitrile. For example, the silcon substituted azine prepared according to Equation 2 can be reacted as follows:

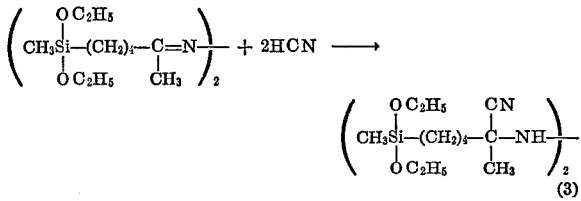

(3)

This reaction is typically conducted in an enclosed reaction vessel at about 25° C. to about 100° C., preferably about 70° C. to about 80° C. The vessel should be able to contain HCN at the reaction temperature. Generally low pressures are employed. An excess of HCN can be used.

This reaction can be conducted with mild agitation in the presence of a solvent, for example, hexane or ethyl ether, if desired. The solvent should be inert, that is, it should not react with the silicon substituted azine, hydrogen cyanide or hydrazonitrile.

When a solvent is used, the hydrazonitrile can be isolated by removing unreacted HCN by vacuum distillation at room temperature or lower. For example, a 1.0 mm. vacuum can be applied to the reaction mixture until no more volatiles are removed. It is important to maintain the hydrazonitrile in substantially anhydrous condition at room temperature or below.

The fourth step in the process is the oxidation of the hydrazonitrile in a suitable solvent in the presence of about a stoichiometric amount of chlorine and subsequent treatment with a tertiary amine base to form the novel silicon substituted azonitrile. For example, the hydrazonitrile prepared according to Equation 3 can be oxidized as follows:

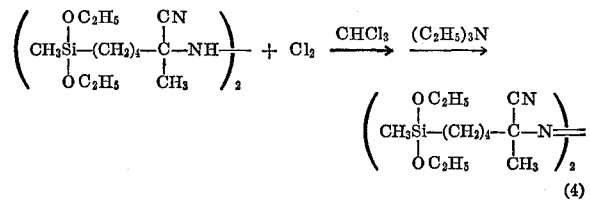

(4)

The product is a novel silicon substituted azonitrile of this invention in which R is methyl, R' and R" are ethoxy, Y is ethylene, and R''' is methyl.

The oxidation reaction is conducted in an anhydrous solvent. Typical solvents are chloroform and ethyl ether. The solvent should be inert, that is, it should not react appreciably with the hydrazonitrile, chlorine or tertiary amine base.

The reaction is conducted in a vessel cooled to about —15° C. to about 10° C., preferably with mild agitation. However, agitation is not required. The preferred temperature is about —5° C. to about 5° C.

Chlorine is used as the oxidant in about a stoichiometric amount. Large excesses of chlorine should be avoided. The chlorine can be added slowly over a period of time to control the evolution of large quantities of heat from the exothermic reaction in a short period of time. Thus, the temperature of reaction can be more readily controlled. Since hydrogen chloride is liberated during the reaction, the reaction vessel should possess the required corrosion resistance.

After the oxidation reaction, the contents of the reaction vessel are reacted with a base, preferably a tertiary amine. Pyridine and triethyl amine are particularly preferred. The base should be one which when reacted with HCl does not yield water, and preferably forms a hydrochloride which is a solid. The hydrochloride should be separable from the reaction mass by means other than heating. It is convenient to remove by filtration the hydrochloride formed by the reaction of Equation 4.

After the removal of the hydrochloride, the product can be isolated from the solvent and any unreacted chlorine. Typically, isolation by application of a vacuum to remove volatiles at room temperature or below is employed. Other methods will be obvious to those skilled in the art. Since the novel silicon substituted azonitrile is sensitive to heat, the product should preferably be stored at about 5° C. or lower.

The reaction is typically conducted at atmospheric pressure until completion of the reaction as indicated by cessation of the evolution of heat. The reaction should be conducted under substantially anhydrous conditions. The sequence of reactions set forth above must be followed in order to obtain the novel silicon substituted azonitriles. This invention will be better understood by reference to the following illustrative examples. All parts, proportions, and percentages are by weight unless otherwise indicated.

EXAMPLE 1

Preparation of 5-hexene-2-one azine

To a 500 ml. round bottom flask, 98 g. of 5-hexene-2-one and 25 g. of hydrazine hydrate are added at about 25° C. (the reaction is exothermic). The mixture is stirred and heated at 100° C. for 6 hours. At the end of that time the organic layer is separated, dried over anhydrous $MgSO_4$, filtered, and distilled on a spinning band column. The 74.1 g. of product having a boiling point of 130° C./23 mm., and $n_D^{26}$ 1.4786 is collected. Yield is 77% of theoretical.

*Analysis.*—Calcd. for $C_{12}N_{20}N_2$ (percent): C, 75.0; H, 10.5; N, 14.6. Found (percent): C, 74.9; H, 10.4; N, 14.4.

EXAMPLE 2

Preparation of 6-methyldiethoxysilylhexan-2-one azine

To a 500 ml. 3-necked round bottom flask equipped with a condenser, magnetic stirrer, thermometer and addition funnel, there is added under nitrogen 51.6 g. at about 25° C. of the 5-hexene-2-one azine prepared in Example 1. Two drops of a conc. chloroplatinic acid solution are added and the mixture stirred vigorously. Methyldiethoxysilane (65.5 g., about 80 ml.) is added to the addition funnel, and 15 ml. of that is added to the flask. The flask is slowly heated in an oil bath, and when the oil bath temperature is about 105° C. and the contents of the flask about 80° C., evolution of heat is noticed. When the flask contents reaches 105° C., the oil bath is removed, and the rest of the silane is added at such a rate that the temperature is maintained at 100–110° C. The solution remains dark yellow throughout. After cooling, the contents of the flask are distilled at 0.2 mm. absolute pressure yielding about 74.4 g. (63% of theoretical yield) of the desired azine (B.P. 148–158° C./0.2 mm., $n_D^{25}$ 1.4517).

*Analysis.*—Calcd. for $C_{22}H_{48}N_2O_4Si_2$ (percent): C, 57.2; H, 10.5; N, 6.1; Si, 12.2. Found (percent): C, 56.5; H, 10.1; N, 6.7, 6.5; Si, 12.2. The infrared and NMR spectra are in accord with the structure.

EXAMPLE 3

Preparation of 1,2-bis(6-methyldiethoxysilyl-2-cyano-2-hexyl)hydrazine

Into a 400 ml. stainless steel bomb are loaded 65 g. of 6-methyldiethoxysilylhexan-2-one azine of Example 2 and 60 ml. of HCN. The bomb is sealed and heated at 75° C. for 4 hours. The bomb is emptied, and the material, now an orange liquid, is transferred to a 300 ml. flask. Unreacted HCN is removed by applying a vacuum (0.5–1.0 mm. abs. pressure) for 2 hours, while the flask is in a wet ice bath, giving a viscous liquid.

*Analysis.*—Calcd. for $C_{24}H_{50}N_4O_4Si_2$ (percent): C, 56.0; H, 9.8; N, 10.9. Found (percent): C, 55.4; H, 9.6; N, 10.7, 10.9. Both the infrared and NMR spectra are in agreement with the structure.

EXAMPLE 4

Preparation of azobis-2(6-methyldiethoxysilyl-2-cyanohexane)

Into a liter 3-necked round bottom flask equipped with condenser, magnetic stirrer, gas inlet tube, and thermometer is added 114 g. of 1,2-bis(6-methyldiethoxysilyl-2-cyano-2-hexyl)hydrazine of Example 3 and about 600 ml. of chloroform chromatographically purified by passing through a column of silica gel. The flask is cooled to about —8° C. in a NaCl/wet ice bath and then chlorine is bubbled in during 4 separate periods of 3–5 minutes each. The temperature during this time is —8° C. to —2° C. After each chlorine addition, a drop of solution is removed and tested with wet (water) starch-iodide paper. At about the end of the fourth addition the characteristic blue color indicative of free chlorine is noted.

The flask contents are subjected to a vacuum for 45 minutes (removing most of the chloroform), and then 35 ml. of pyridine is added. The orange solution is stirred for one hour at about 25° C., and then added to 2 liters of pentane with stirring. A white precipitate forms. The resulting mixture is placed in a freezer overnight at about —10° C.

The next day the mixture is filtered and the solvent is then removed under vacuum from the filtrate on a rotary evaporator overnight, yielding about 105 g. of a yellow liquid (92% of theoretical).

*Analysis.*—Calcd. for $C_{24}H_{48}N_4O_4Si_2$ (percent): C, 56.2; H, 9.4; N, 10.9. Found (percent): C, 54.3; H, 8.9; N, 11.0. The infrared and NMR spectra and chemical properties of this material are in accordance with the structure of azobis-2(6-methyldiethoxysilyl-2-cyclohexane).

EXAMPLE 5

Preparation of 6-(dimethylchlorosilyl)hexane-2-one azine

To a 500 ml. 3-necked round bottom flask equipped with condenser, magnetic stirrer, 250 ml. addition funnel and thermometer, 144 g. of 5-hexene-2-one azine and 2 drops of concentrated aqueous chloroplatinic acid solution is added under nitrogen at about 25° C. Dimethylchlorosilane (156 g.) is added to the addition funnel. After stirring for about 10 min., 15 ml. of the silane is added to the flask. There is no apparent reaction, so the flask is slowly heated to about 110° C. in an oil bath. The rest of the silicon compound is added over a period of 5 hours, and the temperature is maintained at 110° C. during the addition and for an additional 3 hours, after which the flask is allowed to cool.

The material is distilled on an 18" x ⅜" spinning band column, affording 214.5 g. (75% of theoretical) of product, boiling point 127–130° C./0.10 mm. Infrared and NMR spectra are consistent with the structure of 6-(dimethylchlorosilyl)hexane-2-one azine. After standing 3 weeks at room temperature, a sample appeared to have partially decomposed as judged by its cloudy appearance and darkening in color.

*Analysis.*—Calcd. for $C_{16}H_{34}N_2Cl_2Si_2$ (percent): C, 50.4; H, 9.0; N, 7.3; Cl, 18.6. Found (percent): C, 51.0; H, 9.2; N, 7.2; Cl, 18.2.

EXAMPLE 6

Preparation of 6-(methyldichlorosilyl)hexane-2-one azine

Into an apparatus similar to that of Example 5, 144 g of 5-hexene-2-one azine and 2-drops of chloroplatinic acid are charged at 25° C. Methyldichlorosilane (172 ml.) is poured into the addition funnel, and 15 ml. of that into the flask. An exothermic reaction takes place, and as addition is continued the temperature rises to 74° C. The temperature is then controlled with a wet ice bath to between 50° C. and 70° C. The addition takes a total of 1.5 hours.

The next day, a distillation is started on a spinning band column under vacuum, but when the pot gets quite warm, the pressure rises (from 0.4 to 2.0 mm.), and when the pot is cooled the pressure drops. It is evident that the material is decomposing on heating, and the next day, after cooling, it is very viscous.

A similar run is made, except the temperature is controlled to 50° C.–60° C., the total addition time is 1.25 hours, and it is allowed to stir for an additional 1.5 hours. This reaction mixture is then converted directly to the diethoxysilane (see Example 8).

EXAMPLE 7

Preparation of 6-(isobutoxydimethylsilyl)hexane-2-one azine

At ambient temperature hexane (400 ml.), 6-(dimethylchlorosilyl) hexane-2-one azine (96 g.), and triethylamine (69 ml.) are added to a 1 liter 3-necked round bottom flask under nitrogen equipped with a condenser, mechanical stirrer and 125 ml. addition funnel. Isobutanol (46 ml.) is added to the addition funnel, and is then added with stirring to the flask over a period of 30 minutes. The reaction is exothermic, and a white solid forms.

After stirring overnight, the mixture is poured into a 2 liter separatory funnel and washed twice with 500 ml. portions of water. After separating the layers, the organic layer is dried over anhydrous $K_2CO_3$, filtered, and placed on a rotary evaporator under vacuum to remove the hexane. The material is distilled on an 18″ x ⅜″ spinning band column, yielding about 79.6 g. (69%) of 6-(isobutoxydimethylsilyl)hexane-2-one azine, boiling point 134° C./0.10 mm., $n_D^{25}$ 1.4561. The infrared and NMR spectra are in accord with the assigned structure.

*Analysis.*—Calcd. for $C_{24}H_{52}O_2Si_2N_2$ (percent): C, 63.1; H, 11.5; N, 6.1. Found (percent): C, 62.7; 62.5; H, 11.3, 11.4; N, 5.9, 6.1.

EXAMPLE 8

Preparation of 6-methyldiethoxysilyl)hexane-2-one azine

The crude reaction mixture from the preparation of 6-(methyldichlorosilyl)hexane-2-one azine (from Example 6) is transferred to a 3 liter 3-necked round bottom flask equipped with condenser, mechanical stirrer, 250 ml. addition funnel. Under nitrogen, the flask contents are diluted with 1 liter of hexane and 456 ml. of triethylamine at 25° C. Ethanol (192 ml.), which has been added to the addition funnel, is then added dropwise to the flask over a period of 1.5 hours. The reaction is exothermic as evidenced by refluxing of solvent and the mixture becomes quite viscous and difficult to stir because of the solid which forms.

After stirring overnight, the mixture is filtered, the filtrate washed twice with water, dried over anhydrous $K_2CO_3$, filtered, and the solvent removed under vacuum on a rotary evaporator. Upon distillation, about 233 g. (69% of theoretical) of 6-(methyldiethoxysilyl)hexane-2-one azine, boiling point 162° C./0.25 mm., $n_D^{25}$ 1.4533, is isolated. An infrared spectrum is similar to the material obtainable by following Example 2.

EXAMPLE 9

Preparation of 1,2-bis(6-isobutoxydimethylsilyl-2-cyano-2-hexyl)hydrazine

Into a 400 ml. bomb are added 65 g. of 6-(isobutoxydimethylsilyl)hexane-2-one azine and 60 ml. of HCN. The bomb is sealed and heated at 75° C. for 4 hours. The mixture is transferred to a 500 ml. flask with a magnetic stirrer, and subjected to a vacuum (0.5 to 1 mm.) for 2 hours, while being cooled in a wet ice bath. The infrared and NMR spectra of the approximately 68.7 g. (95% of theoretical) of product confirms that it is 1,2-bis(6-isobutoxydimethylsilyl-2-cyano-2-hexyl)hydrazine.

*Analysis.*—Calcd. for $C_{26}H_{54}O_2N_4Si_2$ (percent): C, 61.1; H, 10.7; N, 11.0. Found (percent): C 61.2, 61.0; H, 10.7, 10.6; N, 10.7, 10.4.

EXAMPLE 10

Preparation of azobis-2(6-isobutoxydimethylsilyl-2-cyanohexane)

The material from Example 9 (67 g.) is diluted with 250 ml. of freshly purified chloroform, and a condenser, gas addition tube and thermometer are connected to the flask. The flask is cooled in a wet ice/NaCl bath, the temperature being controlled to between —5° C. and 0° C. Chlorine is added in small portions with stirring the solution being tested with wet starch-KI paper after every addition. After about 8 additions, the test for free $Cl_2$ is positive (paper turned dark blue so the solution is put under vacuum and most of the chloroform is removed. Pyridine (20 ml.) is added, a solid forms, and the mixture is diluted in 1 liter of pentane.

After standing overnight the material is filtered, and the solvent is removed on a rotary evaporator under vacuum. The solution becomes cloudy, so 100 ml. of pentane and 3 ml. of pyridine are added. After refiltering and removing solvent, the reaction mixture is a cloudy brown liquid. A vacuum is applied for 3 days to remove the last traces of solvent and the product, about 59 g. $n_D^{25}$ 1.4548, is analyzed. The infrared and NMR spectra are in agreement with the structure, as is the UV spectrum $\lambda_{max}$. 345 m$\mu$, $\epsilon$=24 (chloroform).

*Analysis.*—Calcd. for $C_{26}H_{52}O_2N_4Si_2$ (percent): C, 61.4; H, 10.3; N, 11.0. Found (percent): C, 60.5, 60.2; H, 10.3, 10.1; N, 10.4, 10.4.

The novel silicon substituted azonitriles have been found to be useful as free radical initiators in polymerization reactions. Furthermore, the presence of silicon in polymers prepared using the compounds of this invention provides moisture reactive cure sites. Thus, the novel compounds of this invention combine azonitrile groups which are useful as free radical initiators, and hydrolyzable silicon groups which can be incorporated in a polymer to provide moisture curable compounds such as caulks.

The following example is illustrative of the use of a novel silicon substituted azonitrile as a free-radical polymerization initiator. All parts, proportions, and percentages are by weight unless otherwise indicated.

EXAMPLE 11

Preparation of a moisture curable ethyl acrylate polymer

To a 1 liter 3-necked round bottom flask equipped with a magnetic stirrer, condenser, and 250 ml. addition funnel and blanketed with nitrogen is added 400 ml. of benzene. To the addition funnel is added 55 ml. of ethyl acrylate and enough benzene to make a total volume of 148 ml. The benzene in the flask is refluxed and 6.0 g. of azobis 2 - (6 - methyldiethoxysilyl - 2 - cyanohexane) prepared as in Example 4, is added by hypodermic syringe. Immediately, addition of ethyl acrylate from the addition funnel is started and added at such a rate that about half of the solution is added every 40 minutes, until at least about 80% is added. The total time of addition is about 2.5 hours, and the solution is refluxed an additional 30 minutes after all the ethyl acrylate is added.

The solvent is removed under vacuum using a rotary evaporator leaving about 50.4 g. of a very viscous liquid. The material is poured into a mold for preparing specimens for tension testing and stored at about 25° C. and 75% relative humidity for 33 days, at the end of which time its vulcanizate properties are tested using an Instron tester at a crosshead speed of 20″/minute according to ASTM method D412. Hardness is tested by ASTM method 2240. Properties obtained are:

$M_{100}$ ---------------------------------------- 34
$T_B$ ---------------------------------------- 56
$E_B$ ---------------------------------------- 140
Shore hardness (A) ---------------------------- 16

Analysis indicates that the material is composed of 61.6% carbon, 5.8% hydrogen, and 0.64% nitrogen.

I claim:
1. A compound of the formula

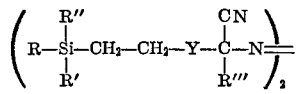

where

R is $C_1$–$C_{18}$ alkyl, cyclohexyl, fluoro-substituted $C_3$–$C_{18}$ alkyl in which no fluoro substituent is closer than the gamma position with respect to Si, phenyl, $C_1$–$C_8$ alkyl-substituted phenyl, fluoro-substituted phenyl, or benzyl;

R′ is selected from $C_1$–$C_8$ alkoxy, phenyl-substituted $C_1$–$C_8$ alkoxy, halogen-substituted benzyloxy, phenoxy, halogen-substituted phenoxy, and $C_1$–$C_8$ alkyl-substituted phenoxy;

R″, independently of R and R′, is any of the above named R or R′ groups;

R‴ is a $C_1$–$C_8$ alkyl, cyclohexyl, alkyl-phenyl wherein the alkyl group is $C_1$–$C_8$, benzyl, or alkylbenzyl where the alkyl group is $C_1$–$C_8$; and Y is $C_1$–$C_6$ alkylene; with the proviso that

can be replaced with a cyclohexane ring.

2. Compound of claim 1 wherein R is $C_1$–$C_6$ alkyl, $C_1$–$C_6$ alkyl substituted phenyl or $C_3$–$C_8$ fluoroalkyl.
3. Compound of claim 1 wherein R‴ is benzyl or a $C_1$–$C_6$ alkyl.
4. Compound of claim 2 wherein R‴ is benzyl or a $C_1$–$C_6$ alkyl.
5. Compound of claim 2 wherein R′ and R″ are methoxy, ethoxy, phenoxy, or benzyloxy.
6. Compound of claim 4 wherein R′ and R″ are methoxy, ethoxy, phenoxy, or benzyloxy.
7. Compound of claim 6 wherein R is methyl.
8. Compound of claim 7 wherein Y is methylene or ethylene.

References Cited
UNITED STATES PATENTS

| | | | |
|---|---|---|---|
| 2,492,763 | 12/1949 | Pinkney | 260—192 |
| 2,515,628 | 7/1950 | Castle | 260—192 |
| 2,586,995 | 2/1952 | Robertson | 260—192 |
| 2,605,260 | 7/1952 | Johnson | 260—192 X |
| 2,823,218 | 2/1958 | Speier et al. | 260—448.2 R |
| 2,934,459 | 4/1960 | Canovai | 260—192 X |

LEWIS GOTTS, Primary Examiner

C. F. WARREN, Assistant Examiner

U.S. Cl. X.R.

260—89.5 AW, 448.2 N